US006922201B2

(12) United States Patent
Blish et al.

(10) Patent No.: US 6,922,201 B2
(45) Date of Patent: Jul. 26, 2005

(54) CHRONOLOGICAL AGE ALTERING LENTICULAR IMAGE

(75) Inventors: Nelson A. Blish, Rochester, NY (US); Jeffery R. Hawver, Rochester, NY (US); Timothy J. Tredwell, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 310 days.

(21) Appl. No.: 10/011,662

(22) Filed: Dec. 5, 2001

(65) Prior Publication Data

US 2003/0103061 A1 Jun. 5, 2003

(51) Int. Cl.[7] ............................ G09G 5/00; G06K 9/32; G06K 9/56; G06K 9/60

(52) U.S. Cl. ........................ 345/646; 382/294; 382/308

(58) Field of Search ................................ 345/619, 646; 382/276, 293, 300, 294, 308

(56) References Cited

U.S. PATENT DOCUMENTS 4,276,570 A * 6/1981 Burson et al. .............. 382/276
5,850,463 A * 12/1998 Horii .......................... 382/118
6,329,987 B1 * 12/2001 Gottfried et al. ........... 345/419

OTHER PUBLICATIONS

Krause, Dorothy. "Dorothy Simpson Krause– the process: Lenticular." Cached on Sep. 18, 2001 by web.archive.org. Accessed on Jun. 10, 2004 at http://web.archive.org/web/20010918153445/http://www.dotkrause.com/process/portrait.html.*

"Animation, Flip, 3D, and Morph Lenticular Effects from Virtual Graphics." Cached on Dec. 7, 2000 by web.archive.org. Accessed on Jun. 10, 2004 at http://web.archive.org/web/20001207153800/http://3dpromo.com/Effects.htm.*

Krause, Dorothy Simpson. "Portrait". 2000. http://www.dotkrause.com/process/portraitLEN.html.*

* cited by examiner

*Primary Examiner*—Matthew C. Bella
*Assistant Examiner*—Aaron Richer
(74) *Attorney, Agent, or Firm*—Nelson Adrian Blish Buskop Law Group, P.C.

(57) ABSTRACT

A chronological age altering lenticular image is comprised of a first photograph (62) of an individual at a first age (64). A second photograph (66) of the individual at a second age (68) and a third photograph (70) of the individual at a third age (72) are included in the composite which comprise the lenticular image. The first, second, and third photographs show the individual at progressively older stages in the individuals life. In another embodiment the first, second, and third photographs show the individual at progressively younger stages in that individuals life.

20 Claims, 7 Drawing Sheets

CHRONOLOGICAL AGE ALTERING LENTICULAR IMAGE

CROSS REFERENCE TO RELATED APPLICATIONS

Reference is made to commonly-assigned U.S. patent application Ser. No. 09/930,691, filed Aug. 15, 2001 issued U.S. Pat. No. 6,574,047, entitled A BACKLIT DISPLAY FOR SELECTIVE ILLUMINATION LENTICULAR IMAGES, by Jeffery R. Hawver, the disclosure of which is incorporated herein.

FIELD OF THE INVENTION

The invention relates in general to lenticular images, and in particular to lenticular images which display images of an individual which gives the appearance of an individual aging or regressing as the lenticular image is moved.

BACKGROUND OF THE INVENTION

Lenticular image, as used herein, describes the class of images that are formed on the back side of a lenticular support or substrate and which provide the ability to selectively view at a certain viewing angle a single image from a set of images. The lenticular substrate is a parallel array of cylindrical lenses, or lenticules, made of a suitable clear material which forms the substrate onto which specially formatted image data is applied. This specially formatted image data as described in the art, consists of separate, parallel image lines or image views placed behind and along the length of each lenticule. These image view lines are alternatively called lineform or integral image data. There are usually many distinct image view lines arranged in parallel behind each lenticule. As the number of view lines behind each lenticule increases, the spacing between each line must decrease proportionally for a given lenticule size. It is not unusual to have image view line spacing on the order of 12 to 15 microns or less depending on the imaging technology used to generate the images.

The thickness of the lenticular substrate is designed so that when the image data is applied to the back surface of the substrate, the image view lines will be located at the back focal distance of each of the individual lenticules. This allows each image view behind a given lenticule to be seen through the lenticule separately from the other image views as the lenticule is observed at different view angles. This is because the cone of light that emanates off a view line, either from transmittance or reflection, to the lenticule lens surface refracts and forms a mostly parallel ray of light exiting the lenslet at an angle determined by the placement of the view line relative to the lenticule. The width of the parallel rays emerging from the lenticule will have the same width as that of the lenticule and thus the view line's width will be seen magnified to that of the lenticule.

The resolution of a lenticular image, in the direction perpendicular to the lenticules, will always be equal to the pitch of the lenticular array. The actual number of different images that can be seen as the viewing angle changes will be the number of image lines placed behind each lenticule. Of course there will always be a practical limit on exactly how many distinct views can actually be resolved. This limit will be determined by such things as the optical quality of the lenses of the lenticular substrate, the resolution of the media used to form the image lines and the manufacturing tolerance for the thickness of lenticular substrate.

Viewing of individual images is accomplished by the cylindrical lenses and the fact that they restrict the view each eyes sees. The changing of views that are visible to each eye is accomplished by changing the viewing angle of the eyes relative to the centerline of the lenticules. This means that either the lenticular media must be rotated or the location of the viewers eye must be physically moved to see the different image views of the lenticular image. Therefore, small lenticular cards are usually held in the hand and rotated, while large lenticular images are usually backlit and firmly mounted with the lenticules in the vertical direction, requiring the viewer to walk past the lenticular image.

Depending on the content of the original source images and how these source images are formatted and applied to the lenticular array substrate, different lenticular image effects can be produced. If the original image source data contains multiple parallax images of a scene, the data can be formatted onto the lenticular substrate in such a way as to produce an autostereoscopic image. In this instance the lenticules are oriented vertically as a person views the stereo image. Since each eye views the lenticules from different angles, each eye sees different views behind the lenticules and the image appears to have the quality of depth.

Another common use for lenticular imaging is to view motion or dynamic image content. In this case a temporal image sequence, which might be from a video clip, is sampled, formatted and applied to the lenticular substrate. When used in this application the lenticules are oriented horizontally and in this case each eye will see exactly the same view. The lenticular image can then be rotated by hand along the horizontal axis of the image so that the eyes see sequences of image views producing the effect of motion or scene change.

Another variation is to place several different image scenes in sequence together on one lenticular card forming a collage. The images may be thematically related but the individual images themselves are usually different pictures. Thus the images may be scenes relating to a family vacation or perhaps a wedding. The number of individual pictures displayed on this type lenticular card is usually limited to two to four. This is due to the fact that as more pictures are added to the lenticular card each individual picture will be seen over a smaller total viewing angle. This makes it difficult for the person viewing the card to see only one image at a time.

It is desirable to have a lenticular image made up of photographs of an individual taken at different periods in an individuals life and that give the appearance of the individual aging as the image is rotated.

SUMMARY OF THE INVENTION

According to one aspect of the present invention a chronological age altering lenticular image is comprised of a first photograph of an individual at a first age. A second photograph of the individual at a second age and a third photograph of the individual at a third age are included in the composite which comprises the lenticular image. The first, second, and third photographs show the individual at progressively older stages in the individuals life. In another embodiment the first, second, and third photographs show the individual at progressively younger stages in that individual's life. As the lenticular image is rotated the individual appears to age. If the lenticular image is rotated in the other direction the individual appears to grow younger.

According to another embodiment of the present invention a lenticular image is comprised of photographs of an individual taken at different times in the individual's life. For example, a child may have a photograph taken at school in the first grade, second grade, and third grade. These photographs are compiled into a lenticular image showing the student's face as he or she matures. Alternatively, if viewed starting from the most current photograph, the student's lenticular image would regress to the youngest age in the collection of photographs. Although three photographs are used in this example, many more photographs may be used, for example, photographs of the individual taken at grade one through grade twelve.

An alternate embodiment of the age regression lenticular photograph includes morphing each year's photographic image to standardize the size of the face in each photograph. Another embodiment automatically centers the face on each photograph based on a position of the subject's eyes, so that the face does not appear to move as the lenticular image is rotated. Yet another embodiment standardizes a background color in each photograph for a greater sense of continuity, and to focus attention on the subject's face rather than the background. A further embodiment of the invention uses computer generated age morphing of a single photograph to produce multiple images of an individual which are used for a composite lenticular image. Yet another embodiment employs computer generated age morphing to provide additional photographs for a composite lenticular image between two widely disparate photos taken many years apart of an individual.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
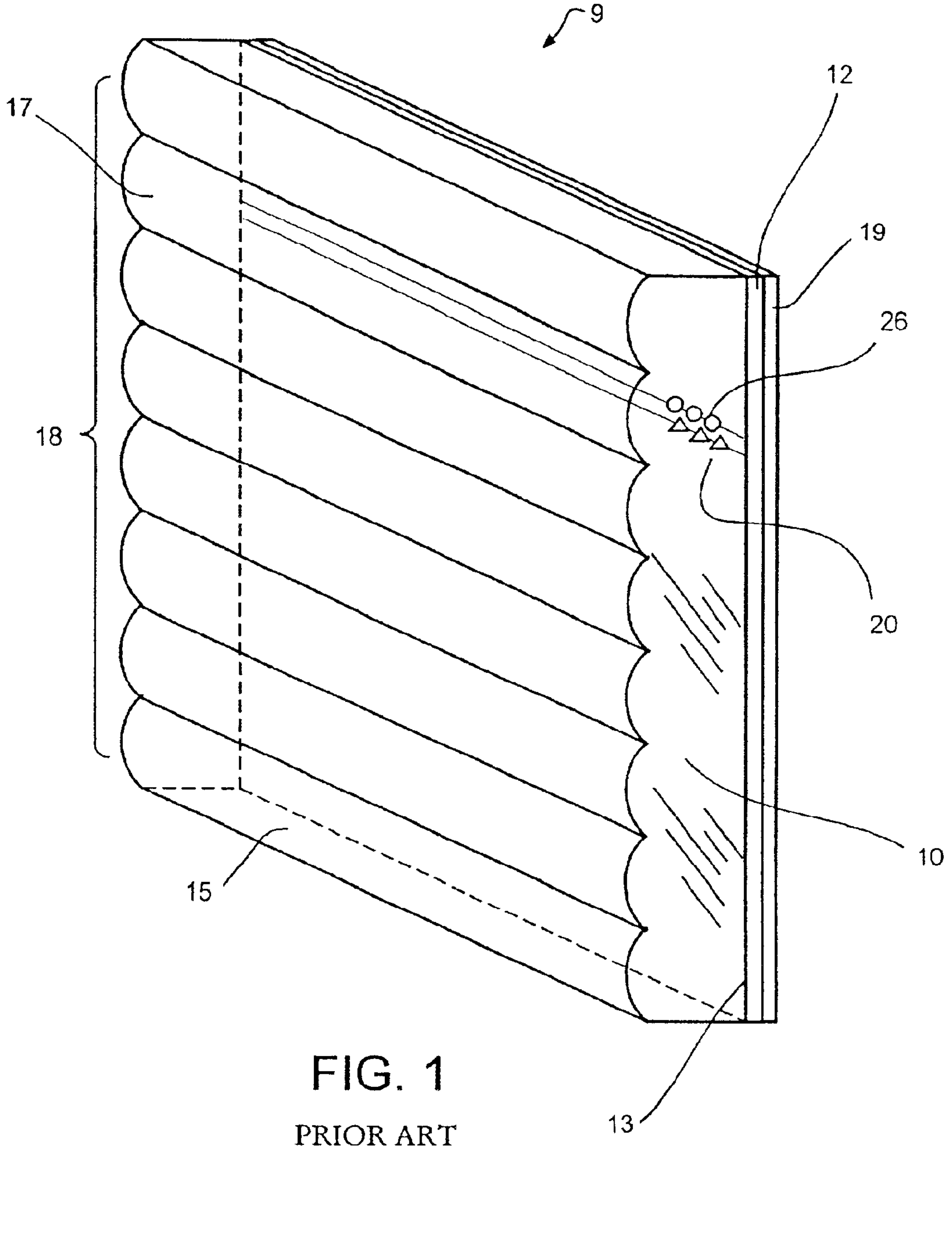
FIG. 1 PRIOR ART
FIG. 1 is a perspective view of a typical, prior art lenticular image card.

FIG. 1 is a typical lenticular image with a clear lenticular substrate 10, having a back surface 13 and a front surface 15 wherein a parallel array of cylinder lenses or lenticular lenses 18 have been formed. The curvature of the lenticules and the thickness of the substrate is such that the flat back surface 13 is at the focal distance of the lenses. Onto the back surface 13, is applied an image bearing layer 12 which contains the specially formatted image data. The image data behind lenticule 17, is partially shown for simplicity as two parallel lines of image points 20 and 26, the different image content represented as triangles and circles. In reality every lenticule will have multiple image view lines formed behind it on the image bearing layer.

The image bearing layer must be accurately registered with the lenticular array both in parallelism and position in order for the lenticular image to appear correctly. Depending on the type of image bearing layer 12, there may also be a diffusive reflective layer 19 laminated to the image bearing layer. This diffusive reflective layer 19 is provided to reflect light directed from the lenticule side back out so the images can be viewed from the front. Alternately, some lenticular image cards are viewed in a transmissive mode, where the diffusive reflective layer 19 does not reflect but transmits and diffuses light from a source coming from behind.

Figure 2A:
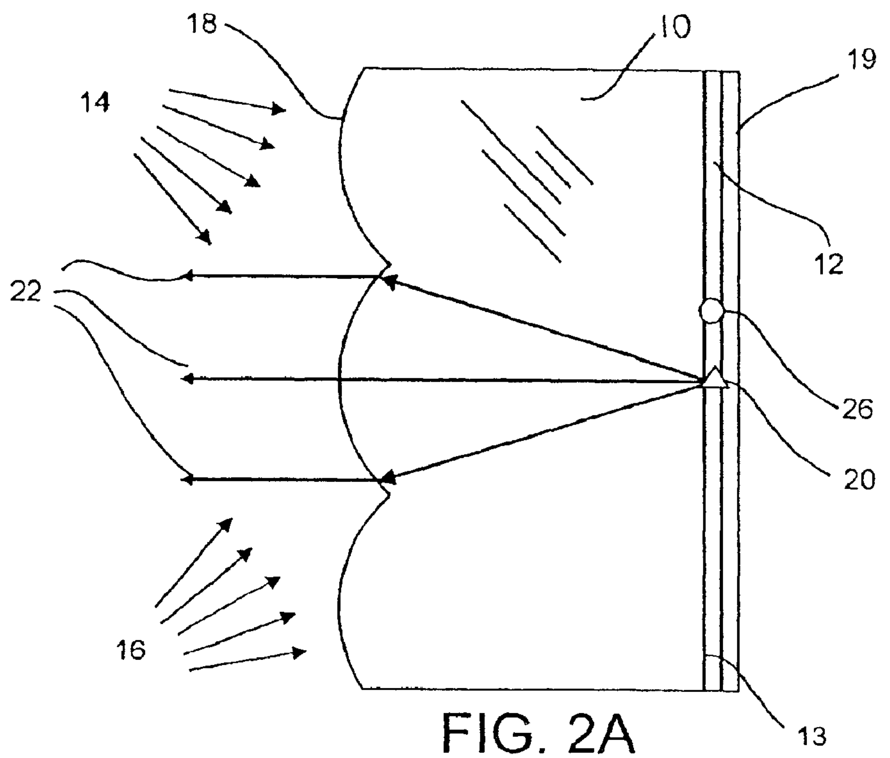
FIG. 2A PRIOR ART
FIGS. 2A and 2B are schematic views illustrating how the lenticules provide selective image viewing allowing only one image view to be observed from a particular viewing angle.

FIG. 2A depicts a side view of lenticular substrate 10, with an array of lenticular lenses 18. Only three lenses are shown. When diffuse ambient illumination light sources 14 and 16, pass in front of the lenticules through the lenses and clear substrate, it illuminates the image bearing layer 12 on the back surface 13 of the lenticular substrate 10. A cone of illumination will then reflect off diffusive reflective layer 19 and image point 20 of the image bearing layer 12 and back out through the lens. However, because the image layer is at the focal distance of each lenticule, the light cone coming from any spot on the image layer will emerge as a collimated beam 22 from the surface of the lens. The exact angle of the collimated beam with respect to the center line of the lenticules depends on the location of the image spot relative to the center of the lens through which the light is transmitted. In FIG. 2A, image point 20 is located exactly on the center line of the lens and so the collimated beam emerges parallel to the center axis of the lens.

Figure 2B:
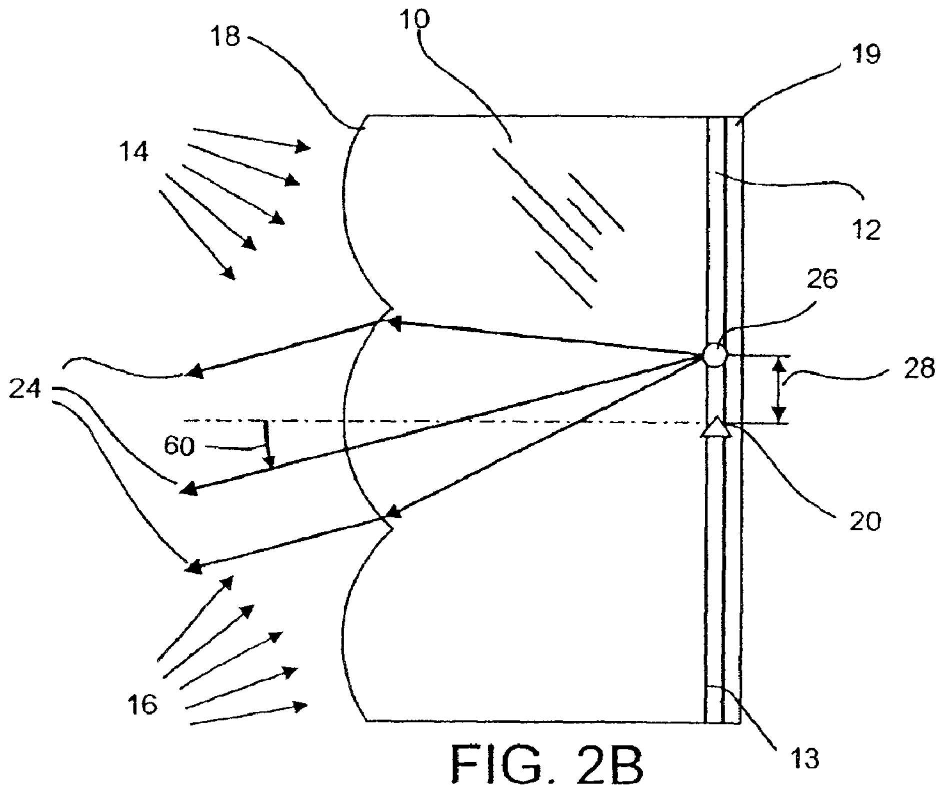
FIG. 2B PRIOR ART

FIG. 2B depicts a different image point 26, which is at a distance 28 above the lens central axis. Because of this, the cone of light from image point 26, emerges from the lenticule at an angle 60, with respect to the lens central axis. Hence, it can readily been seen that image points 20 and 26 can be viewed through the same lenticule but at different view angles. When a viewer's eye is looking at a lenticular image, the particular image spot visible to the eye depends upon the angle of the eye's viewpoint with respect to the center line of the lenticular media. The ability of lenticular images to selectively see different image views at different viewing angles produces all the image effects such as autostereoscopic 3D, motion, and collages. Discussions from this point on will focus on the type of lenticular images where the images are viewed with the lenticules oriented in the horizontal direction.

Figure 3:
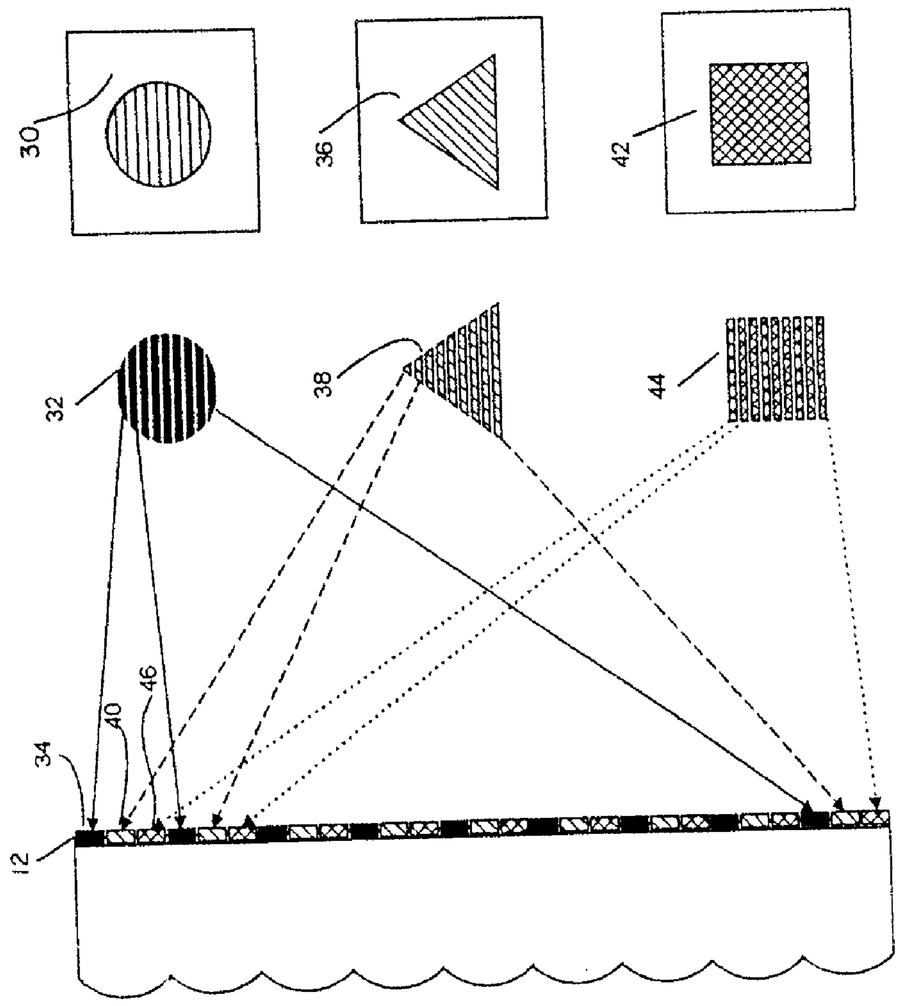
FIG. 3 PRIOR ART
FIG. 3 is a diagrammatic view of the process of formatting image information from source pictures to be placed onto the image layer.

FIG. 3 schematically represents how image data is formatted behind each of the lenticules to produce a collage effect. In this figure there are three different source images consisting of a circle 30, a triangle 36, and a square 42. Each of these images is sampled in the vertical direction at the resolution of the final lenticular image. Since there are a total of nine lenticules on the media in this example, each image must be sampled to form lineform images of nine lines. The source images are shown sampled to the left of the original images as circle 32, triangle 38 and square 44. The image sampling in the horizontal direction can be at a different resolution and is typically much higher.

The sampling process is usually done using digital scanning and image processing techniques to produce the lineform images. Once the three images have been sampled they then are formed into one composite image file and printed onto the image bearing layer 12. This is done by interlacing the individual lines from each image. Since there are three source images there will be three image view lines behind each lenticule. The image data is then formatted so that the first line of each image is placed behind the first lenticule. As shown in FIG. 3, line one of circle image data 32 is placed behind the first lenticule at image location 34. Line one of the second triangle image data 38 is placed behind the first lenticule at location 40, and line one of the third square image data 44 is placed behind the first lenticule at location 46.

The second line of each image is then interlaced so that they fall behind the second lenticule. This is continued until all image lines from each source image have been interlaced.

As shown in FIG. 3, all image view lines from top to bottom are placed exactly behind each lenticule. In fact if the image data is applied to the lenticules in this way a problem will exist for the viewer looking at the images through the lenticules. The problem is that the viewer will not be able to see any one view completely at a given position. This is because all parallel rays emerging from the image view lines from one image will not converge to the viewer's eye position. However, the image views can be made to converge by spacing the image view lines at a pitch slightly lower than the pitch of the lenticules. Increasing the magnification of the image data in the vertical direction causes the image data to be slightly longer than the lenticular media. This produces a convergence of image view lines to a specified point and is termed the viewing distance of the lenticular image.

Figure 4:
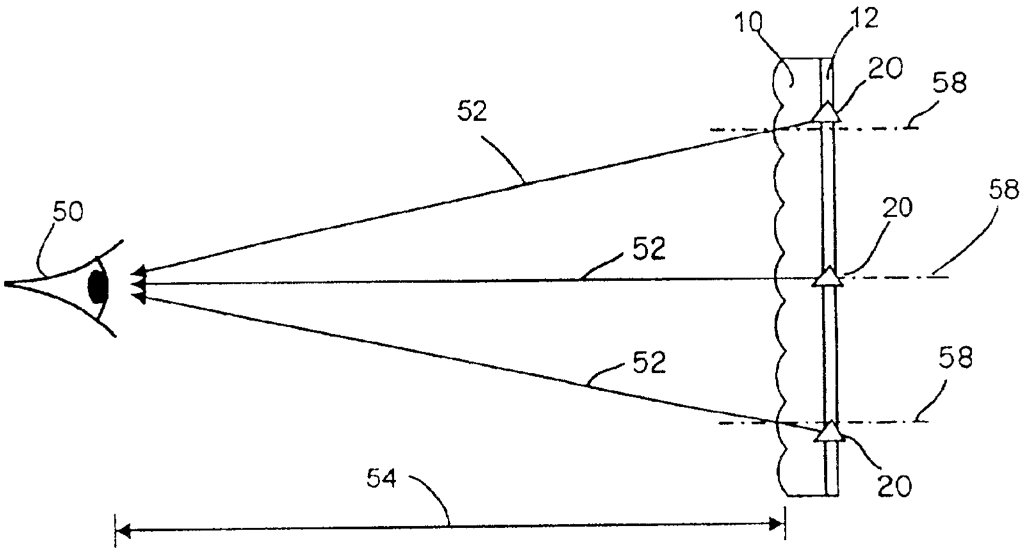
FIG. 4 PRIOR ART
FIG. 4 is a schematic view illustrating how the viewing distance of a lenticular image is defined.

This is illustrated clearly in FIG. 4 which shows the rays 52 of the image views of the center image of triangle image point 20 converging to the viewer's eye 50 at the viewing distance 54 of the lenticular image. This convergence is caused by the fact that the image view lines are displaced from being centered on lenticule center lines 58 as the distance of the image view lines get farther from the lenticular image center.

Figure 6:
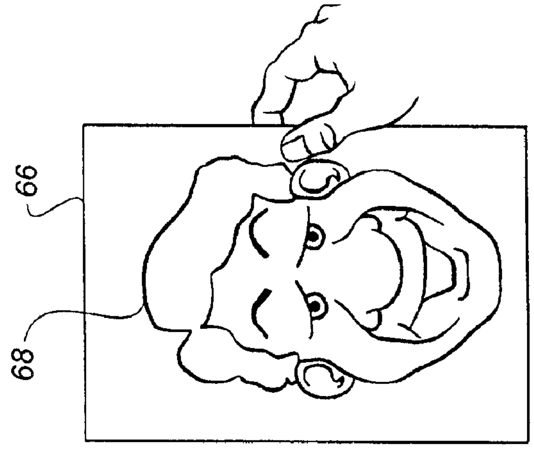
FIG. 6 is a schematic of a lenticular image according to the present invention held at a second position showing a photograph of the individual shown in FIG. 5 taken at a later age.
Figure 5:
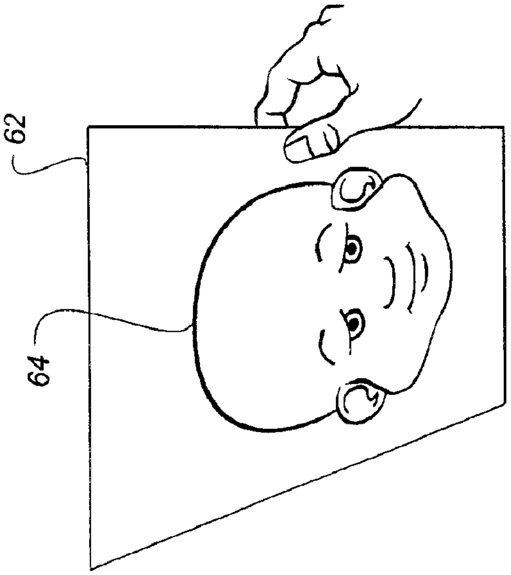
FIG. 5 is a schematic of a lenticular image according to the present invention held at a first position showing a photograph of an individual taken at a first age.

FIG. 5 is a schematic representation of a first photograph 62 of a first individual 64 taken at a first age. This first photograph, which is part of a interleaved composite forming a lenticular image as discussed above, is shown when held at a first position as shown. FIG. 6 shows a second photograph 66 of the same individual taken at a different point in that individual's life 68. Once again, this second photograph 66 is part of an interleaved composite image which forms the lenticule image and can be viewed when the lenticular image is held at a second position as shown.

Figure 7:
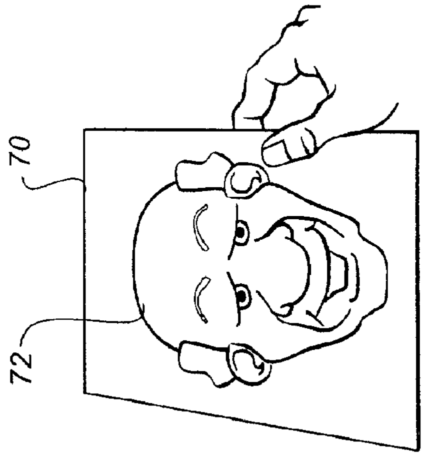
FIG. 7 is a schematic of a lenticular image according to the present invention held at a third position showing a photograph of the individual in FIGS. 5 and 6 taken at a yet later age.

FIG. 7 shows a third photograph 70 which shows the same individual shown in FIGS. 5 and 6 taken at a third age 72. The third photograph 70 forms part of the composite lenticular image and is viewable at a third angle as shown in FIG. 7.

In operation, as the lenticular image is rotated from the first position shown in FIG. 5, to the second position shown in FIG. 6, to the third position shown in FIG. 7, the individual appears at three distinct periods of life progressing in age. If the lenticular image was rotated in a reversed direction starting with FIG. 7 and proceeding to FIG. 5, the lenticular image would show the individual at the same distinct periods in life in reverse order and appear to regress in age. Although only three images have been shown it is anticipated that more images would be used for a smoother transformation between the oldest and the youngest image in the group of composite images which form the lenticular image. As the number of intervening images is increased the effect of age progression or regression could be made to appear as a continual aging process in either direction.

If only three images were available to form the chronological age altering lenticular image, morphing software could be used to generate additional images which would form part of the composite interleaved lenticular image to smooth the transition from one age to the other age for the individual. This could be done even if only two photographs were available, for example, if FIG. 5 and FIG. 6 show the individual at a first age and at a second age were the only photographs available, morphing software could be used to generate a plurality of intermediate photographs which would then be interleaved to form part of the composite photograph which made up the chronological age altering lenticular image.

Figure 8:
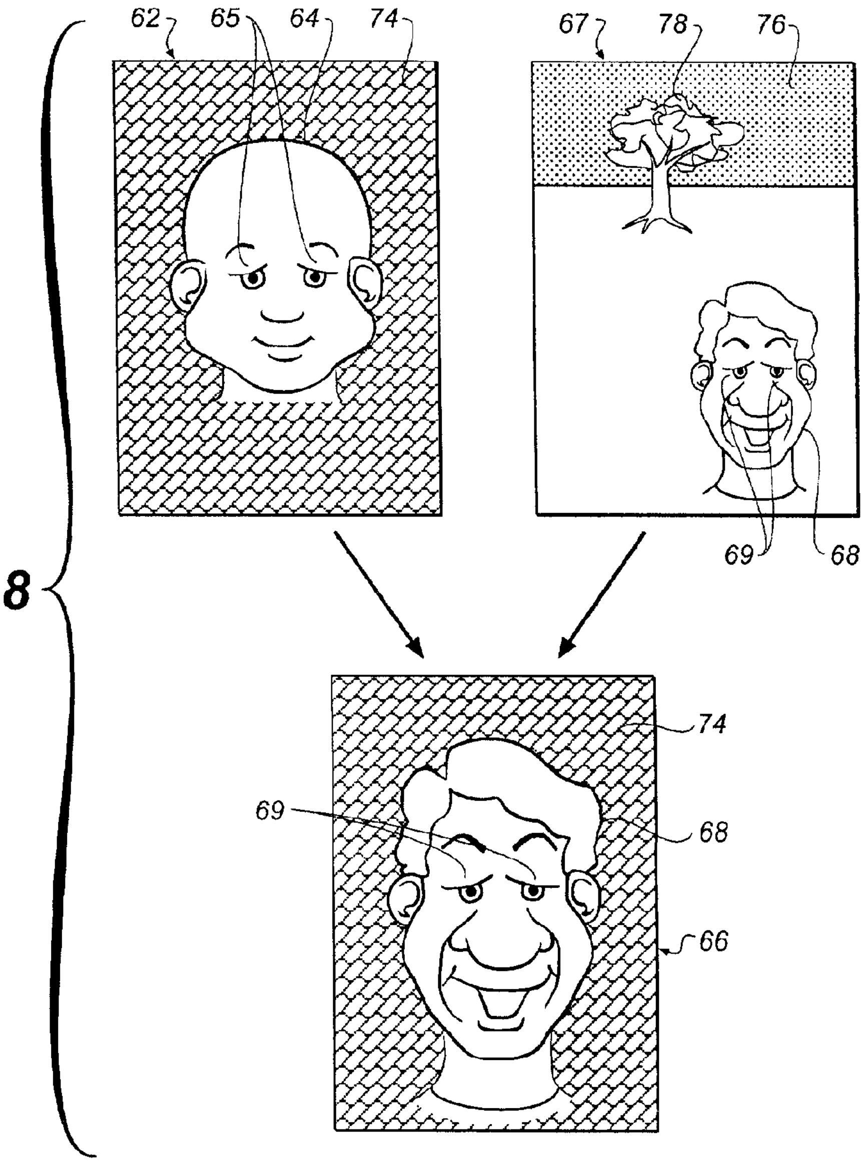
FIG. 8 are schematic representations of how the composite photographs of a lenticular image would be resized and centered according to the present invention.

Referring now to FIG. 8, another feature of the present invention is shown. It may happen that individual photographs, which are selected to show an individual at different ages, are not oriented in a similar fashion. For example, the first photograph 62 shows the individual at a first age 64 relatively centered in photograph 62. An off-center photograph 67 showing the same individual at a second age would not provide a smooth, flowing, chronological age altering lenticular image if it was interleaved with the first photograph 62. Contour mapping software is then used to resize the image of the individual at a second age 68 so that its relative position in the second photograph 66 is approximately the same as the position of the individual at a first age 64 in the first photograph 62. There are a number of other suitable ways available for resizing and centering the image of the individual at a second age 68. One method would be contour matching software which would center the position of the individual at a second age 68 based on the position of the individual's eyes 69 to bring them into relative alignment with the position of the eye 65 of the individual at a first age 64.

Another problem that may be encountered is the background features of the different photographs may be distracting in photographs taken by a number of different people using different equipment at different days and at different times. Thus, for example, the background in the first photograph 74 may be red. In the off-centered photograph 67 the background 76 may be blue. Commercially available software is used to change the background color of one of the photographs, in this case the off-centered photograph 67, to use the same background color as the first photograph 62. Some of the photographs may also have undesirable background features which would detract from the chronological age altering lenticular image if left in the photograph. Thus, by way of example, a tree 78 in off-centered photograph 67 would also be removed to produce the second photograph in the composite image 66. This operation is preferably done by using image altering software which is commercially available but could be done manually, as could the other operations discussed above.

Figure 9:
FIG. 9 is a schematic of a photograph of a second individual which would be used in a lenticular image.

FIG. 9 shows another embodiment of the present invention which shows a photograph 80 of a second individual 82.

Figure 11:
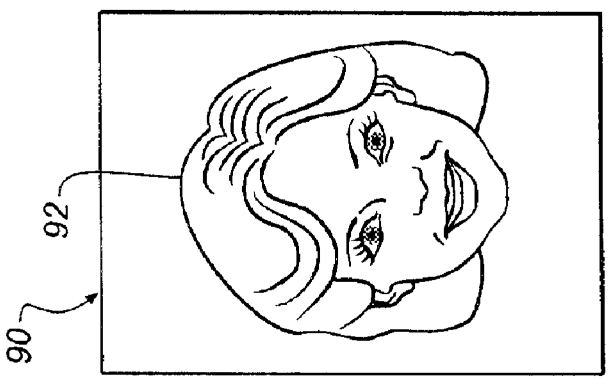
FIG. 11 is a schematic of a photograph which would be used in a lenticular image of yet a third individual preferably a member of familial group comprised of the second and third individual.
Figure 10:
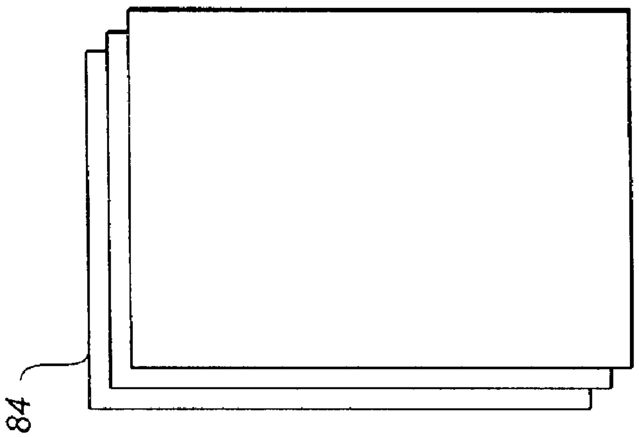
FIG. 10 is a schematic representation of a plurality of intermediate morphed images.

It may be desirable by some individuals to emphasize the similarities in familial groups, such as for example, a mother and daughter. FIG. 9 shows a photograph of a daughter 82, for purposes of illustration. FIG. 11 shows a photograph 90 of yet another individual 92, in this case the mother of daughter 82 shown in FIG. 9. Using these two photographs a plurality of morphing images 84 are generated, shown schematically in FIG. 10, which provide a smooth transition of images between the daughter 82, shown in FIG. 9, and the mother 92, shown in FIG. 11. When the photograph 80 of the daughter 82 the plurality of morphed images 84 and the photograph 90 of the mother 92 are interleaved to generate a composite lenticular image. The image will show the transition from the daughter to the mother. This would emphasize familial traits in the two distinct individuals. This technique could also be applied to individuals who are not part of the same familial group. As discussed above, the two photographs 80 and 90 may have to be altered to provide similar backgrounds in the photograph and centering of the individual in the photographs.

The invention has been described in detail with particular reference to certain preferred embodiments thereof, but it will be understood that variations and modifications can be effected within the scope of the invention. For example, although photographs showing the face of individuals have been used the invention described herein could be used to show other features of individuals such as full body photographs. The technique is also extendable to inanimate objects.

Parts List

10. Lenticular substrate
12. Image bearing layer
13. Back surface
14. Diffuse ambient light
15. Front surface
16. Diffuse ambient light
17. Lenticule
18. Lenticular lenses
19. Diffusive reflective layer
20. Triangle image point
22. Collimated beam
26. Image point
28. Distance
30. Circle
32. Circle image data
34. Image location
36. Triangle
38. Triangle image data
40. Location
42. Square
44. Square image data
46. Location
50. Viewer's eye
52. Rays
54. Viewing distance
58. Lenticular lines
60. Angle
62. First photograph
64. First age of individual
65. Position of eye
66. Second photograph
67. Off-center photograph
68. Second age of individual
69. Position of individual's eyes
70. Third photograph
72. Third age of individual
74. Background of first photograph
76. Background of second photograph
78. Tree
80. Photograph
82. Daughter
84. Morphing images
90. Photograph
92. Mother

What is claimed is:

1. A chronological age altering lenticular image comprised of:

a first photograph of an individual at a first age of the individual;

a second photographic image of said individual at a second age of the individual;

a third photograph of said individual at a third age of the individual;

wherein said third age is greater than said second age and wherein said second age is greater than said first age;

wherein said second photographic image is created by morphing software and is between said first and third photograph; and wherein rotation of said lenticular image gives an appearance of said individual aging as said first photograph, second photographic image, and third photograph are viewed sequentially through lenticules on said lenticular image.

2. A chronological age altering lenticular image as in claim 1 wherein a time interval between said first age and said second age is approximately equal to a time interval between said second age and said third age.

3. A chronological age altering lenticular image as in claim 1 wherein a software program resizes a third image of said individual in said third photograph to approximately a size of a first image of said individual in said first photograph prior to morphing.

4. A chronological age altering lenticular image as in claim 1 wherein a software program centers a position of said individual in said third photograph to a relative position in said third photograph which approximates a relative position of said individual and said first photograph prior to morphing.

5. A chronological age altering lenticular image as in claim 4 wherein said positions are centered based on a relative position of said subject's eyes.

6. A chronological age altering lenticular image as in claim 1 wherein a background color in each of said photographs is standardized.

7. A chronological age altering lenticular image as in claim 1 wherein the morphing software generates additional images between said first photograph and said second photographic image so that said individual appears to age at a regular rate between said first photograph and said second photographic image.

8. A chronological age altering lenticular image as in claim 7 wherein the morphing software generates additional images between said second photographic image and said third photograph so that said individual appears to age at regular intervals between said second photographic image and said third photograph.

9. A chronological age altering lenticular image as in claim 1 wherein said rotation of said lenticular image causes said individual to appear to regress in age.

10. A chronological age altering lenticular image as in claim 1 wherein said rotation of said lenticular image causes said individual to appear to progress in age.

11. A chronological age altering lenticular image as in claim 1 wherein a time interval between said first age and said second age is chosen so that said second age forms a middle transition between said first age and said third age.

12. A method of creating a chronological age altering lenticular image comprising:

creating a first image of an individual at a first age taken on a first date;

creating a second image of said individual at a second age taken on a second date;

forming at least one intermediate image of said individual at a third age corresponding to a time between the first date and a second date using morphing software and is between said first and second image; and interleaving said images to create said chronological age altering lenticular image.

13. The method of creating a chronological age altering lenticular image as in claim 12 wherein a time interval between said first date and said third date is approximately equal to a time interval between said second date and said third date.

14. The method of creating a chronological age altering lenticular image as in claim 12 wherein the morphing software program resizes said second image to approximately a size of said individual in said first image.

15. The method of creating a chronological age altering lenticular image as in claim 12 wherein the morphing software program centers said second image with respect to a relative position of said first image.

16. The method of creating a chronological age altering lenticular image as in claim 15 wherein said second image is centered based on a relative position of said subject's eyes in said first image and said second image.

17. The method of creating a chronological age altering lenticular image as in claim 12 wherein a background color in each of said images is standardized.

18. The method of creating a chronological age altering lenticular image as in claim 12 wherein the morphing software generates a plurality of images between said first and second image so that said individual appears to age at a regular rate between said first and said second image.

19. A chronological age altering lenticular image comprised of:

a first photograph of an individual at a first age of the individual;

a second photograph of said individual at a second age of the individual wherein said first age and said second age are different;

a photographic image of said individual at a third age of the individual different from said first age and said second age of the individual wherein said third age is intermediate between said first and second age; and wherein the photographic image is created by morphing software and is between said first and second photograph.

20. A method of creating a chronological age altering lenticular image comprising the steps of:

creating a first photograph of an individual at a first date of the individual;

creating a second image of said individual at a second date of the individual wherein said second date is different from said first date;

creating a third photograph of said individual at a third date of the individual wherein said third date is different from said first date and said second date;

wherein said second image is created by using morphing software between said first photograph and third photograph; and wherein an interval of time between said second date and said first date is approximately equal to an interval of time between said second date and said third date and in a same chronological direction.

* * * * *